United States Patent
DeVal et al.

(10) Patent No.: US 7,912,969 B2
(45) Date of Patent: Mar. 22, 2011

(54) METHODS AND APPARATUS FOR RANDOMIZATION OF PERIODIC BEHAVIOR IN COMMUNICATION NETWORK

(75) Inventors: Gary John DeVal, Raleigh, NC (US); Curtis Eldon Hrischuk, Holly Springs, NC (US); Erich Miles Nahum, New York, NY (US); John Michael Tracey, Scarsdale, NY (US); Xiping Wang, Scarsdale, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/971,619

(22) Filed: Jan. 9, 2008

(65) Prior Publication Data

US 2009/0177779 A1    Jul. 9, 2009

(51) Int. Cl.
*G06F 15/16* (2006.01)
(52) U.S. Cl. ............... 709/228; 709/227; 709/203
(58) Field of Classification Search .......... 709/227–228, 709/204–206, 203
See application file for complete search history.

(56) References Cited

U.S. PATENT DOCUMENTS

| | | | |
|---|---|---|---|
| 7,478,245 B2 * | 1/2009 | Allen | 713/185 |
| 2003/0005280 A1 | 1/2003 | Bobde et al. | |
| 2005/0009542 A1 | 1/2005 | Oprescu-Surcobe et al. | |
| 2005/0025091 A1 * | 2/2005 | Patel et al. | 370/328 |
| 2005/0041640 A1 * | 2/2005 | Nasielski et al. | 370/352 |
| 2006/0121899 A1 * | 6/2006 | Willey et al. | 455/435.1 |
| 2006/0155814 A1 * | 7/2006 | Bennett et al. | 709/207 |
| 2006/0209775 A1 | 9/2006 | Lim et al. | |
| 2006/0242300 A1 | 10/2006 | Yumoto et al. | |
| 2006/0294241 A1 * | 12/2006 | Cherian et al. | 709/227 |
| 2007/0019634 A1 * | 1/2007 | Fisher et al. | 370/352 |
| 2007/0025341 A1 | 2/2007 | Baigal et al. | |
| 2007/0076696 A1 | 4/2007 | An et al. | |
| 2007/0203983 A1 * | 8/2007 | Fukuhara et al. | 709/204 |
| 2008/0209045 A1 * | 8/2008 | Rothstein et al. | 709/227 |
| 2008/0313321 A1 * | 12/2008 | Kiss et al. | 709/223 |

FOREIGN PATENT DOCUMENTS

WO    WO03081431    10/2003

* cited by examiner

*Primary Examiner* — Salad Abdullahi
(74) *Attorney, Agent, or Firm* — Preston J. Young; Ryan, Mason & Lewis, LLP

(57) ABSTRACT

A technique for use in a client, wherein the client supports a state-based signaling protocol (e.g., Session Initiation Protocol or SIP), includes initiating a given session state between the client and a server that also supports the state-based signaling protocol, and refreshing the given session state in a randomized manner. Further, a technique for use in a server, wherein the server supports a state-based signaling protocol (again, e.g., SIP), includes randomly assigning an expiration time duration for a given session state between the server and a client that also supports the state-based signaling protocol, and reporting the randomly assigned expiration time for the given session state to the client. By randomizing various behaviors of the client, the server, or both, bursty traffic in the communication network is reduced or eliminated.

20 Claims, 6 Drawing Sheets

400

```
REGISTER sip:example.com SIP/2.0
Via: SIP/2.0/UDP 10.1.2.3:5061;branch=z9hG4bK-17291-1-0
From: user <sip:user@example.com>;tag=1
To: user <sip:user@example.com>
Contact: <sip:user@10.1.2.3:5061>;transport=UDP
Call-ID: 1-17291@10.1.2.3
CSeq: 1 REGISTER
Content-Length: 0
Expires: 900
Max-Forwards: 10
```

FIG. 6

```
SIP/2.0 200 OK
Via: SIP/2.0/UDP 10.1.2.3:5061;branch=z9hG4bK-17291-1-0
From: user <sip:user@example.com>;tag=1
To: user <sip:user@example.com>;tag=329ca25ff8cbb8668bd2.10b0
Call-ID: 1-17291@10.1.2.3
CSeq: 1 REGISTER
Expires: 887
Contact: <sip:user@10.1.2.3:5061>
Content-Length: 0
```

FIG. 7

```
SIP/2.0 200 OK
Via: SIP/2.0/UDP 10.1.2.3:5061;branch=z9hG4bK-17291-1-0
From: user <sip:user@example.com>;tag=1
To: user <sip:user@example.com>;tag=329ca25ff8cbb8668bd2.10b0
Call-ID: 1-17291@10.1.2.3
CSeq: 1 REGISTER
Contact: <sip:user@10.1.2.3:5061>;expires=932
Content-Length: 0
```

```
SIP/2.0 423 Interval Too Brief
Via: SIP/2.0/UDP 10.1.2.3:5061;branch=z9hG4bK-17291-1-0
From: user <sip:user@example.com>;tag=1
To: user <sip:user@example.com>;tag=329ca25ff8cbb8668bd2.10b0
Call-ID: 1-17291@10.1.2.3
CSeq: 1 REGISTER
Min-Expires: 923
Content-Length: 0
```

METHODS AND APPARATUS FOR RANDOMIZATION OF PERIODIC BEHAVIOR IN COMMUNICATION NETWORK

FIELD OF THE INVENTION

The present invention generally relates to communication networks and, more particularly, to techniques for randomizing behavior of computing devices in such communication networks.

BACKGROUND OF THE INVENTION

A communication network typically includes multiple nodes or computing devices referred to as "servers" that, among other things, process requests from other computing devices referred to as "clients" that are accessing the network.

An example communication network is one that supports the Session Initiation Protocol (SIP). SIP is an application-level control protocol for setting up and tearing down sessions with one or more participants. Such sessions may typically involve Internet telephone calls (i.e., so-called Voice over Internet Protocol or VoIP calls) or video calls. However, SIP may be used in other applications where session initiation is required. Also, SIP is merely a signaling (control) protocol which serves to create, modify and terminate sessions, while other session protocols (e.g., Real-time Transport Protocol or RTP) are used to handle the actual transfer of the media content (e.g., voice or video data). Further, SIP acts as a carrier for the Session Description Protocol (SDP), which describes the media content of the session.

SIP servers (and all servers, in general) must be provisioned correctly to handle the peak offered load (processing of requests). If the offered load has bursts, the effective maximum throughput of a server is reduced; as the server must be provisioned to handle such bursts. Another possibility is that these bursts may cause the server to report errors, fail, or behave in other unexpected and undesirable ways due to overload conditions resulting from too many messages being processed.

Accordingly, there is a need provide techniques that overcome these and other drawbacks in such communication networks.

SUMMARY OF THE INVENTION

Principles of the invention provide techniques for randomizing behavior of computing devices in communication networks.

For example, in a first aspect of the invention, a method for use in a client, wherein the client supports a state-based signaling protocol, comprises initiating a given session state between the client and a server that also supports the state-based signaling protocol, and refreshing the given session state in a randomized manner.

In one embodiment, the step of refreshing the given session state in the randomized manner may comprise the client assigning a random refresh expiration time duration and sending a session state refresh message to the server within a time interval before the end of the random refresh expiration time duration.

In another embodiment, the step of refreshing the given session state in the randomized manner may comprise the client assigning a refresh expiration time duration and sending a session state refresh message to the server within a randomly selected time interval before the end of the refresh expiration time duration.

The state-based signaling protocol may be a Session Initiation Protocol (SIP) and the given session state may be a SIP registration state, a SIP publication state, or a SIP subscription state.

In second aspect of the invention, a method for use in a server, wherein the server supports a state-based signaling protocol, comprises randomly assigning an expiration time duration for a given session state between the server and a client that also supports the state-based signaling protocol, and reporting the randomly assigned expiration time for the given session state to the client.

In a SIP embodiment, the reporting step may comprise reporting the random expiration time duration to the client using an expires header of a successful response.

Further, in a SIP embodiment, the step of randomly assigning an expiration time duration may comprise assigning a random minimum allowed expiration time duration, and the reporting step may comprise reporting the random expiration time duration to the client using a min-expires header of an error reply.

In a specific embodiment where the given session state is a SIP registration state, the step of randomly assigning an expiration time duration may comprise assigning a random registration expiration time duration. Thus, the reporting step may comprise reporting the random registration expiration time duration to the client using an expires field of a contact header of a successful response.

In a specific embodiment where the given session state is a SIP subscription state, the step of randomly assigning an expiration time duration may comprise assigning a random subscription expiration time duration. Thus, the reporting step may comprise reporting the random subscription expiration time duration to the client using an expires parameter of a subscription-state header in a notify message.

In a specific embodiment where the given session state is a SIP publication state, the step of randomly assigning an expiration time duration may comprise assigning a random publication expiration time duration. Thus, the reporting step may comprise reporting the random publication expiration time to the client using an expires header or the min-expires header of an error reply.

Advantageously, techniques of the invention randomize various behaviors of the client, the server, or both, so as to reduce or eliminate bursty traffic in the communication network.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 illustrates a second example of a randomized message according to an embodiment of the invention;

FIG. 7 illustrates a third example of a randomized message according to an embodiment of the invention;

DETAILED DESCRIPTION OF PREFERRED EMBODIMENTS

The present invention will be explained below in the context of the Session Initiation Protocol (SIP). However, it is to be understood that the present invention is not limited to this particular communication protocol. Rather, the invention is more generally applicable to any communication network that supports a suitable communication protocol in which it would be desirable to improve provisioning of communication resources.

As illustratively used herein, the term "burst" generally refers to an uneven pattern or non-uniform rate of data transmission, i.e., sometimes a very high data transmission rate while other times it might be very low.

We have observed in laboratory benchmark measurements that servers which use protocols that exhibit periodic state refresh behavior, for example, the Session Initiation Protocol (SIP), tend to interact with clients in ways that inherently cause load bursts.

For example, consider a server that receives requests at a uniform rate and has a queue that can accommodate some number of requests. Without stalls, the server processes these requests at a uniform rate, the replies are sent at the same rate, and the occupancy of the queue remains roughly the same.

Unfortunately, a server may periodically stall for many reasons, failing to service requests for some period of time, due to operating system (OS) scheduling, background OS activity, automatic garbage collection, intermittent network failures, lock contention, synchronous behavior, and more. During the stall, requests are stored in a queue. After a stall, the server will typically service all of the requests in its queue in rapid succession. This quick servicing of queued requests can create a positive feedback loop that results in even larger bursts being created, since the processed messages can in turn result in almost instantaneous responses from the clients, which are lightly loaded. Our lab measurements of SIP servers show that there can be periodic bursts that are three times the queued messages.

Figure 1:
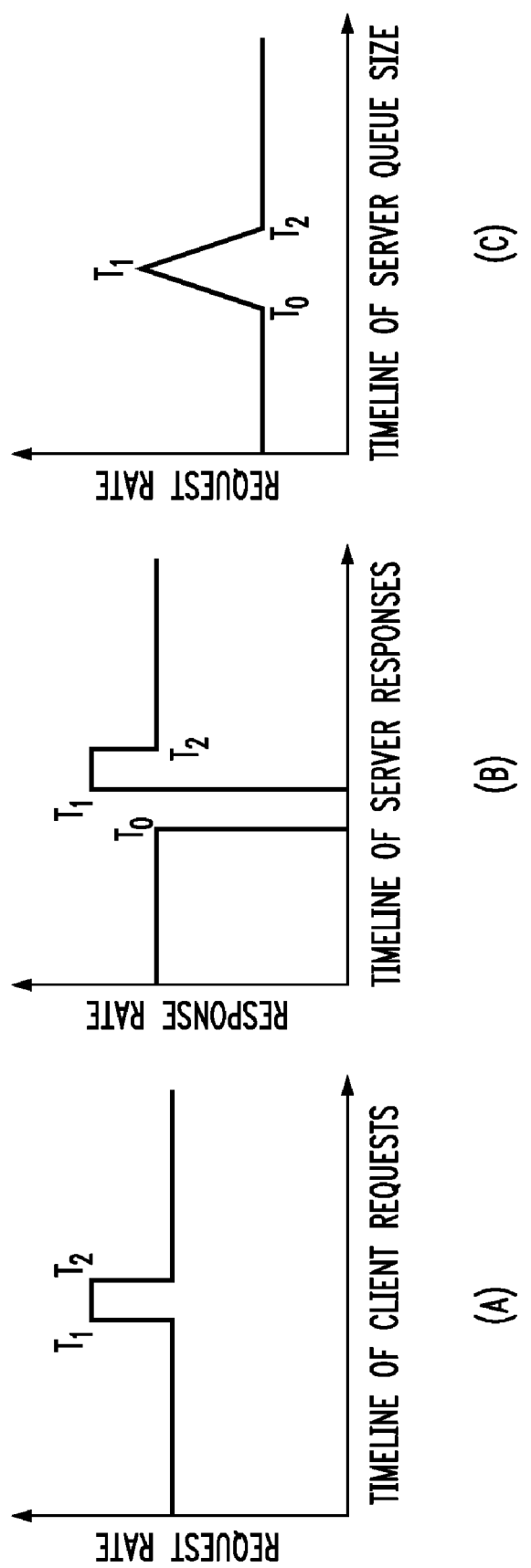
FIG. 1 illustrates the effect of a single burst on server load.

This effect is illustrated in FIG. 1, which depicts the rate of client requests (A), server responses (B), and the number of requests in the queue of the server or server queue size (C). The client population is sending at a uniform request rate. At time T0, the server stalls, which results in its queue building up. At time T1, the stall is over and the server resumes servicing requests; resulting in three effects, the server begins to service requests in rapid success so the queue size decreases and the number of responses increases. As the client pool receives these responses in rapid succession, if the responses require further action, the clients produce a corresponding burst of requests. After time T2, the queue of the server returns to its original length and the request rate normalizes. However, if the period between time T0 and time T1 is long enough, the queue may grow so large that the server is subject to overload between time T1 and time T2. Since this behavior is common, the server must be provisioned to handle these bursts.

When this behavior is combined with protocols that require periodic soft-state refreshes, this bursty behavior becomes even worse. The bursty behavior of the server will also lead to the clients responding in an aggregate synchronized fashion. The clients receive the bursty replies of the server in rapid succession, each setting a timer for a fixed period of time until the next soft-state refresh. When the next refresh interval arrives, all the client timers expire simultaneously, resulting in a burst of client refresh requests which must be serviced in addition to the traffic normally handled by the server.

Figure 2:
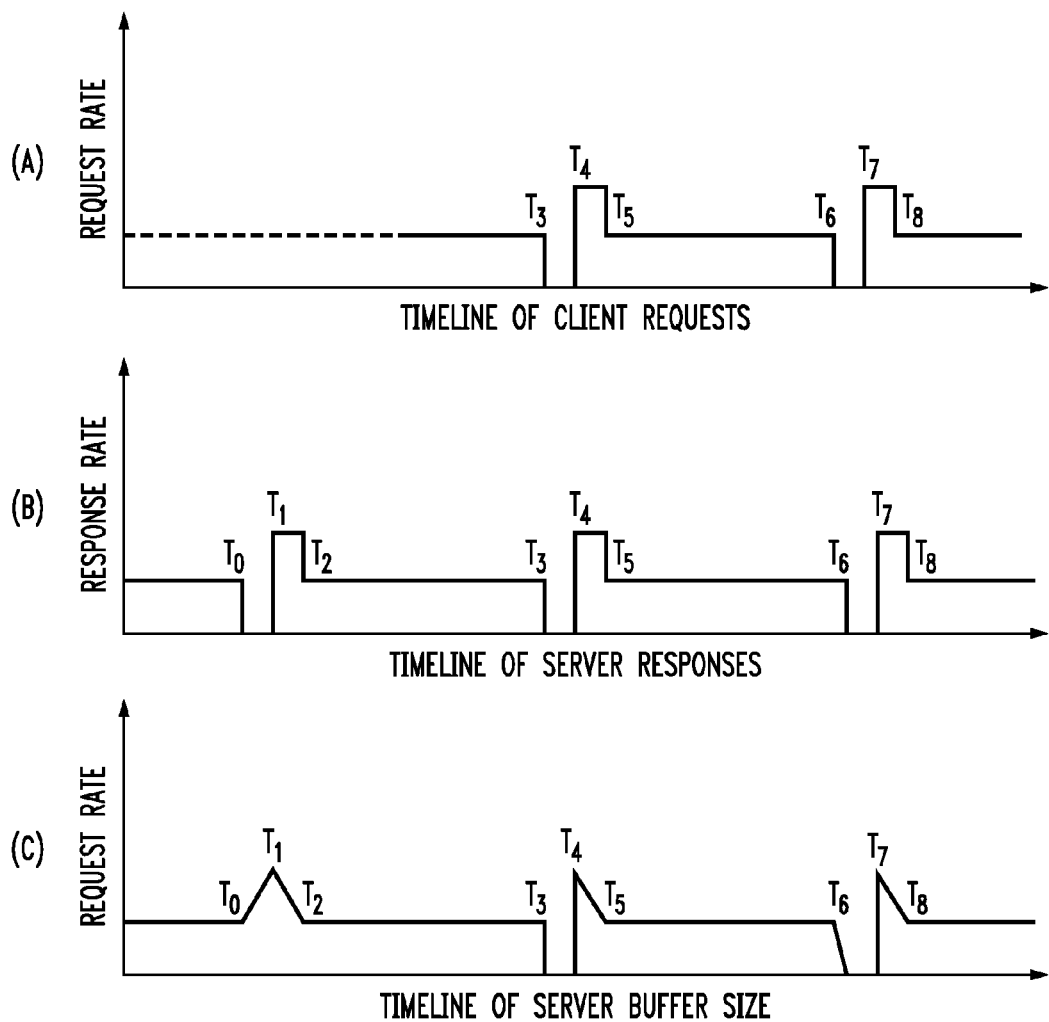
FIG. 2 illustrates that a single stall can result in periodic burstiness.

This periodic burstiness is shown in FIG. 2. As in FIG. 1, FIG. 2 depicts the rate of client requests (A), server responses (B), and the number of requests in the queue of the server or server queue size (C). At time T0, the server stalls, thus preventing it from sending replies and its queue building until time T1 when the server resumes processing requests. The soft-state refresh requests that would normally have been handled between times T0 and T1 have been delayed until the interval between T1 and T2.

When the client resets its soft-state refresh timer to a fixed value (d), this phenomenon is propagated to the next set of requests. For example, in this diagram, time T3 is equal to T0+d and T4 is equal to T1+d. As no responses were received by clients in the region between times T0 and T1, no client has a fixed timer that fires between times T3 and T4, creating a trough in the offered load. At time T4, however, all the clients that were serviced between times T1 and T2 have their soft-state refresh timer fire, resulting in a burst between times T4 and T5. These bursts propagate themselves every soft-state refresh interval from then on (e.g., see times T6, T7 and T8).

Figure 3:
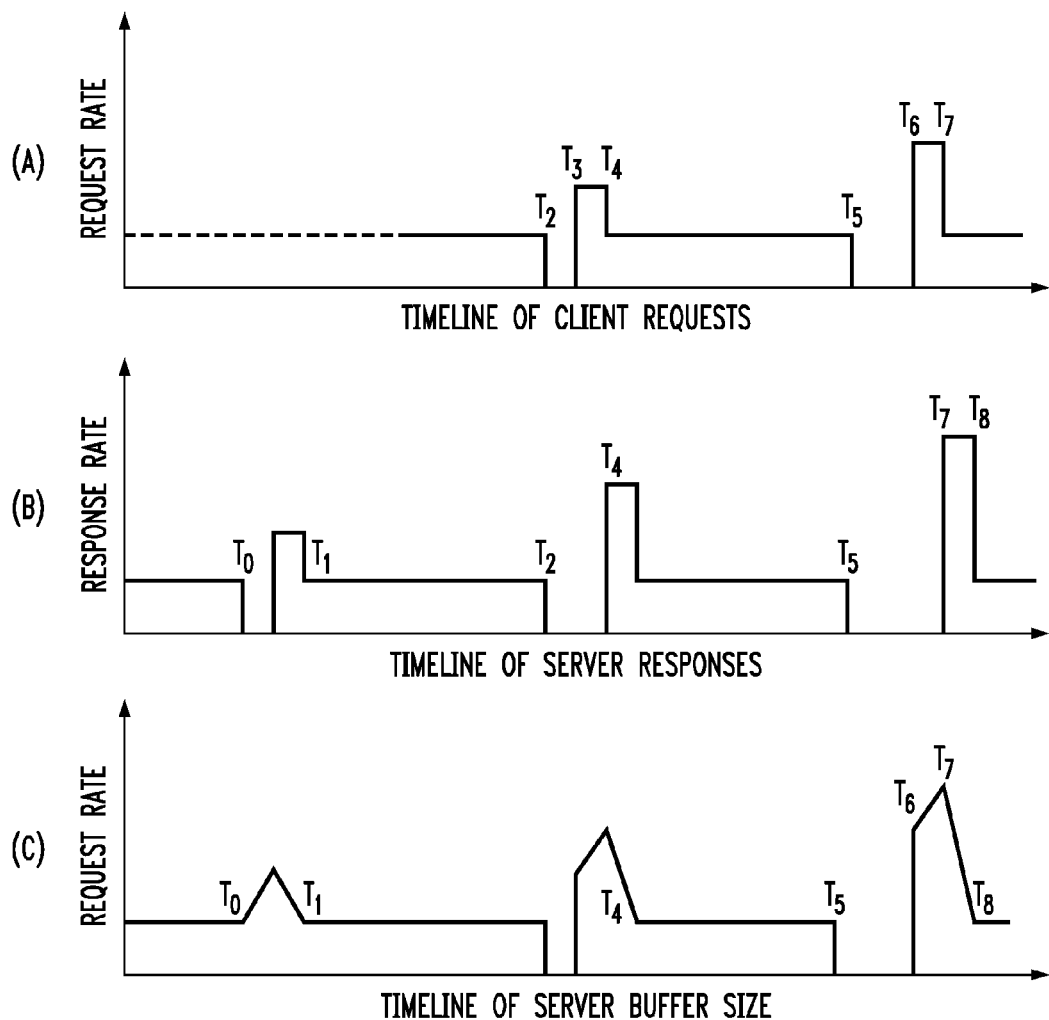
FIG. 3 illustrates that periodic burstiness can cause further stalls and increasing burst sizes.

Even worse, a burst in the offered load often results in further stalls, and successively larger bursts and stalls. This escalating burstiness is illustrated in FIG. 3. As in FIGS. 1 and 2, FIG. 3 depicts the rate of client requests (A), server responses (B), and the number of requests in the queue of the server or server queue size (C).

As in FIG. 2, at time T0 in FIG. 3, the server stalls, thus preventing it from sending replies and its queue building until time T1 when the server resumes processing requests. The soft-state refresh requests that would normally have been handled between times T0 and T1 have been delayed until the interval between T1 and T2. When the client resets its soft-state refresh timer to a fixed value (d), this phenomenon is propagated to the next set of requests. For example, in this diagram time T3 is equal to T0+d and T4 is equal to T1+d. As no responses were received by clients in the region between times T0 and T1, no client has a fixed timer that fires between times T3 and T4, creating a trough in the offered load. At time T4 however, all the clients that were serviced between times T1 and T2 have their soft-state refresh timer fire, resulting in a burst. Increasing the offered load on a server often causes further stalls (e.g., by cycling through memory allocations and deallocations faster than usual, resulting in more garbage collection). These stalls create a positive feedback loop, with each successive stall creating a larger burst of traffic.

Although the pathological case of ever-increasing burst sizes may not be very common as there are some perturbations introduced by outside factors, bursts do occur and propagate themselves through a soft-state refresh request stream.

To prevent this positive feedback loop from escalating, principles of the invention propose that clients and servers that implement soft-state protocols can replace fixed expiration and refresh intervals with randomized values, thus preventing server stalls from creating future bursts.

Figures 4, 5:
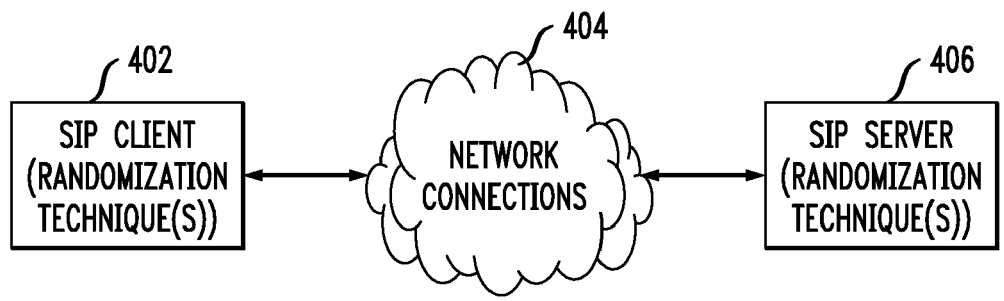
FIG. 4 illustrates a simplified communication network in which principles of the invention can be implemented.
FIG. 5 illustrates a first example of a randomized message according to an embodiment of the invention.

FIG. 4 illustrates a simplified communication network in which principles of the invention can be implemented. As shown, in communication network 400, Session Initiation Protocol (SIP) client 402 communicates via network connections 404 with SIP server 406. Of course, a communication network typically has a plurality of clients and servers, and FIG. 4 is merely intended to be a simplified version of a network and is used for the purposes of illustratively describing behavior randomization techniques of the invention. In any case, it is understood that messages (examples of which are described below) are sent between client 402 and SIP server 406 via other network nodes and links that compose network connections 404. The content of the messages themselves may implement the behavior randomization techniques and/or the timing of message transmission may implement the behavior randomization techniques, as will be illustratively explained below.

As is known, SIP servers are an increasingly important infrastructure component for voice, instant messaging, presence, and converged applications. Many SIP features require clients to periodically refresh soft state (e.g., registration, publication, or subscription data) usually using fixed timers between refreshes. This behavior combined with our measurements in the lab leads us to conclude that server responses tend to lead to bursty behavior. This was illustrated above in the context of FIGS. 1-3. As observed from the server, these soft state refreshes should ideally be uniformly distributed, so that in any period of time no more requests are received than in any other equal period of time. Since SIP is a rich protocol that provides great flexibility for the servers and the clients, randomization according to the invention can be provided at both the client and the server. SIP is described in, for example, Internet Engineering Task Force (IETF) RFC 3261, "SIP: Session Initiation Protocol," June 2002, which is incorporated by reference herein.

When generating a REGISTRATION message, the client selects an expiration time for the registration message; for example 15 minutes or 900 seconds as shown in the expires header of the message shown in FIG. 5. The client must then refresh this registration within 900 seconds to prevent it from expiring. Clients typically refresh the registration some several minutes before it expires (e.g., every ten minutes or 600 seconds) using a fixed value or percentage of the registration duration.

In accordance with principles of the invention, if the client refreshes this registration in a randomized fashion (e.g., uniformly distributed between 9 and 11 minutes), then server stalls will not result in future bursts. The client can also randomly assign the expiration duration to the message and thus the refresh interval. Thus, it is to be understood that the message of FIG. 5 can be sent from the client to the SIP server again in a randomized fashion (e.g., uniformly distributed between 9 and 11 minutes) to refresh the registration, and/or the SIP client can randomly assign the expiration duration (e.g., 900 seconds in the example of FIG. 5).

The same principles can be applied to SIP clients that utilize the PUBLISH and SUBSCRIBE methods, which are used for event notification such as presence.

The SIP protocol also gives the server control over the duration of soft-state information. Server 406 may randomize the soft-state duration, and then report it back to client 402. For example, the "200 OK" response that a server generates to a REGISTER request has two ways of notifying the client of the actual expiration time used for the registration.

First, the "200 OK" response may include an Expires header, which indicates the expiry for all contacts (except those, with a per-contact expires attribute). For example, the message in FIG. 6 informs the client that the registration will expire in 887 seconds.

Second, the "200 OK" may include expires attributes for each contact, as in the example message shown in FIG. 7, which informs the client that the actual registration period is 932 seconds.

The server may also use a combination of these two techniques to notify the client about the server-selected randomized duration of registration information.

Rather than returning a successful reply, a SIP server can also force clients to use randomly distributed registration durations through the use of a Min-Expires header. By randomly extending the minimum time that a host wishes to register for, the server can prevent future bursts among synchronized clients. For example, the interval in the error reply shown in FIG. 8 instructs the client that it must register for at least 923 seconds.

Presence is an emerging SIP workload, which can be used for instant messaging buddy lists, location based services, and more. In SIP, all presence information is maintained as soft-state information which must be periodically refreshed. The server has control over the soft-state expiration in much the same way as a registration, and thus can randomize the publication and subscription durations. These randomized durations can then be reported by SIP server 406 to SIP client 402 using the Expires header within a "200 OK" response and "423 Interval Too Brief" response for the PUBLISH and SUBSCRIBE messages.

For event subscription, SIP server 406 can additionally use the Subscription-State header in a NOTIFY message. For example, a subscription transaction begins with a SUBSCRIBE request that is sent from the client to the SIP presence server. The server then responds with a "200 OK" response and an additional NOTIFY request is sent from SIP server 406 to SIP client 402, indicating the state of the subscription in a Subscription-State header. This will generally be the value "active", which includes an expiration. For example, "Subscription-State: active; expires=3615" indicates that the subscription will expire in 1 hour and 15 seconds.

Figures 8, 9:
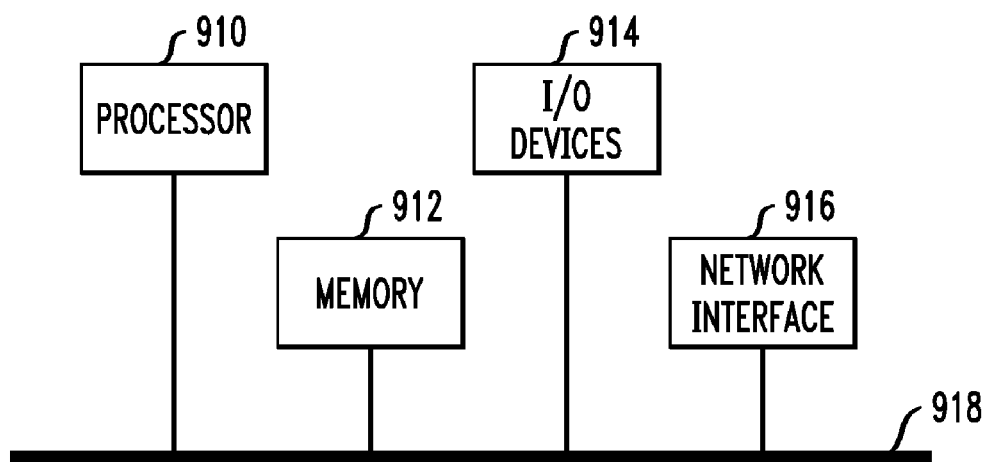
FIG. 8 illustrates a fourth example of a randomized message according to an embodiment of the invention.
FIG. 9 illustrates a computer system wherein techniques for randomizing behavior may be implemented, according to an embodiment of the invention.

Referring lastly to FIG. 9, a computer system is illustrated wherein techniques for behavior randomization may be implemented according to an embodiment of the invention. That is, FIG. 9 illustrates a computer system in accordance with which one or more components/steps of the behavior randomization techniques (e.g., components and methodologies described above in the context of FIGS. 1 through 8) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 9 may represent a processing architecture for implementing each of SIP client 402 and SIP server 406.

As shown, computer system 900 includes processor 910, memory 912, input/output (I/O) devices 914, and network interface 916, coupled via a computer bus 918 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a client, wherein the client supports a state-based signaling protocol, the method comprising the steps of:
   initiating a given session state between the client and a server that also supports the state-based signaling protocol; and
   refreshing the given session state in a randomized manner;
   wherein the step of refreshing the given session state in the randomized manner comprises the client assigning a random refresh expiration time duration to the given session state and reporting the random refresh expiration time duration to the server.

2. The method of claim 1, wherein the step of refreshing the given session state in the randomized manner comprises the client sending a session state refresh message to the server within a time interval before the end of the random refresh expiration time duration.

3. The method of claim 1, wherein the step of refreshing the given session state in the randomized manner comprises the client sending a session state refresh message to the server within a randomly selected time interval before the end of the random refresh expiration time duration.

4. The method of claim 1, wherein the state-based signaling protocol is a Session Initiation Protocol (SIP) and the given session state is a SIP registration state.

5. The method of claim 1, wherein the state-based signaling protocol is a Session Initiation Protocol (SIP) and the given session state is a SIP publication state.

6. The method of claim 1, wherein the state-based signaling protocol is a Session Initiation Protocol (SIP) and the given session state is a SIP subscription state.

7. The method of claim 1, further comprising the step of receiving an expiration time duration randomly assigned by the server for the given session state.

8. The method of claim 7, wherein the receiving step comprises receiving the random expiration time duration from the server using an expires header of a successful response.

9. The method of claim 7, wherein the received expiration time duration comprises a random minimum allowed expiration time duration.

10. The method of claim 9, wherein the receiving step comprises receiving the random expiration time duration from the server using a min-expires header of an error reply.

11. The method of claim 7, wherein the state-based signaling protocol is a Session Initiation Protocol (SIP) and the given session state is a SIP registration state.

12. The method of claim 11, wherein the received expiration time duration comprises a random registration expiration time duration.

13. The method of claim 12, wherein the receiving step comprises receiving the random expiration time duration from the server using an expires field of a contact header of a successful response.

14. The method of claim 7, wherein the state-based signaling protocol is a Session Initiation Protocol (SIP) and the given session state is a SIP subscription state.

15. The method of claim 14, wherein the received expiration time duration comprises a random subscription expiration time duration.

16. The method of claim 15, wherein the receiving step comprises receiving the random subscription expiration time duration from the server using an expires parameter of a subscription-state header in a notify message.

17. The method of claim 7, wherein the state-based signaling protocol is a Session Initiation Protocol (SIP) and the given session state is a SIP publication state.

18. The method of claim 17, wherein the received expiration time duration comprises a random publication expiration time duration.

19. Apparatus for use in a client, wherein the client supports a state-based signaling protocol, the apparatus comprising:
   a memory; and
   a processor coupled to the memory and operative to perform the steps of
   initiating a given session state between the client and a server that also supports the state-based signaling protocol; and
   refreshing the given session state in a randomized manner;
   wherein the step of refreshing the given session state in the randomized manner comprises assigning a random refresh expiration time duration to the given session state and reporting the random refresh expiration time duration to the server.

20. The apparatus of claim 19, wherein the processor is further operative to perform the step of receiving an expiration time duration randomly assigned by the server for the given session state.

* * * * *